United States Patent [19]

Holmes

[11] 4,216,895

[45] Aug. 12, 1980

[54] METHOD OF FORMING HOLLOW BOOM

[75] Inventor: Terry M. Holmes, Schofield, Wis.

[73] Assignee: J. I. Case Company, Racine, Wis.

[21] Appl. No.: 965,799

[22] Filed: Dec. 4, 1978

Related U.S. Application Data

[62] Division of Ser. No. 844,213, Oct. 21, 1977, Pat. No. 4,171,598.

[51] Int. Cl.[3] .......... B23K 31/00; E04H 12/34

[52] U.S. Cl. .......... 228/178; 228/166; 228/182; 29/155 R

[58] Field of Search .......... 228/174, 178, 182, 184, 228/164–167; 29/150, 155 R, 155 C; 52/731, 732, 720, 115, 118, 634, 636; 212/144, 55

[56] References Cited

U.S. PATENT DOCUMENTS

| | | | |
|---|---|---|---|
| 1,656,810 | 1/1928 | Arnstein | 52/731 |
| 2,092,472 | 9/1937 | Rafter | 52/731 |
| 2,098,676 | 11/1937 | Rafter | 52/731 |
| 2,185,384 | 1/1940 | Rafter | 29/155 R |
| 2,365,696 | 12/1944 | Grubb | 228/184 |
| 2,988,182 | 6/1961 | Campbell | 52/720 |
| 3,103,262 | 9/1963 | Handley | 52/720 |
| 3,104,454 | 9/1963 | Handley et al. | 29/155 R |
| 3,256,671 | 6/1966 | Handley | 52/731 |
| 3,300,060 | 1/1967 | Lado | 212/144 |
| 3,345,794 | 10/1967 | Proud | 52/731 |
| 3,440,790 | 4/1969 | Nerem | 29/155 R |
| 3,740,917 | 6/1973 | Wong | 29/155 R |
| 3,874,136 | 4/1975 | Michel | 52/115 |
| 3,972,571 | 8/1976 | Benkowski | 52/115 |
| 3,999,354 | 12/1976 | Anter et al. | 29/155 R |
| 4,003,168 | 1/1977 | Brady | 52/118 |
| 4,016,688 | 4/1977 | Tiffin et al. | 212/144 |

FOREIGN PATENT DOCUMENTS

| | | | |
|---|---|---|---|
| 26253 | 12/1907 | Sweden | 52/732 |
| 120991 | 12/1918 | United Kingdom | 52/731 |

*Primary Examiner*—Daniel C. Crane

*Attorney, Agent, or Firm*—Dressler, Goldsmith, Shore, Sutker & Milnamow, Ltd.

[57] ABSTRACT

A hollow rectangular boom formed with four corner sections of identical cross section and plates interconnecting the corner sections is disclosed herein. Each of the corner sections is identical and is generally L-shaped in cross section with first and second legs each having a recess with adjacent pairs of corner sections being interconnected by flat plates received into the respective recesses and welded therein. The invention also resides in the method of assembling the various parts to form the hollow boom sections.

7 Claims, 7 Drawing Figures

Fig. 4.
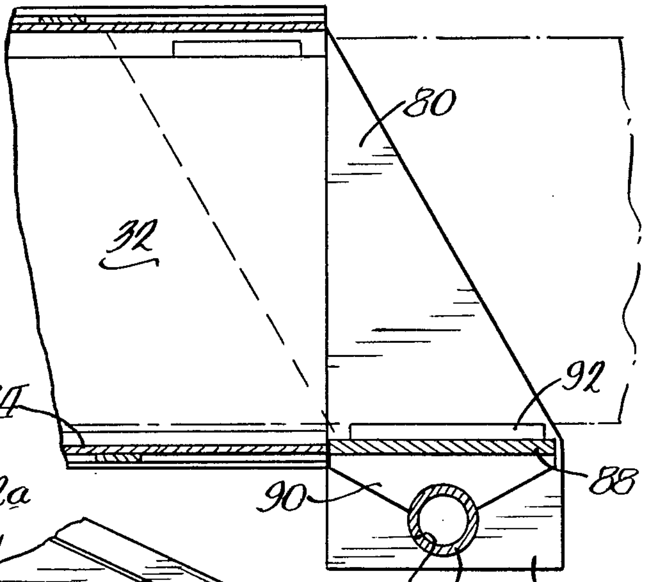
Fig. 5.
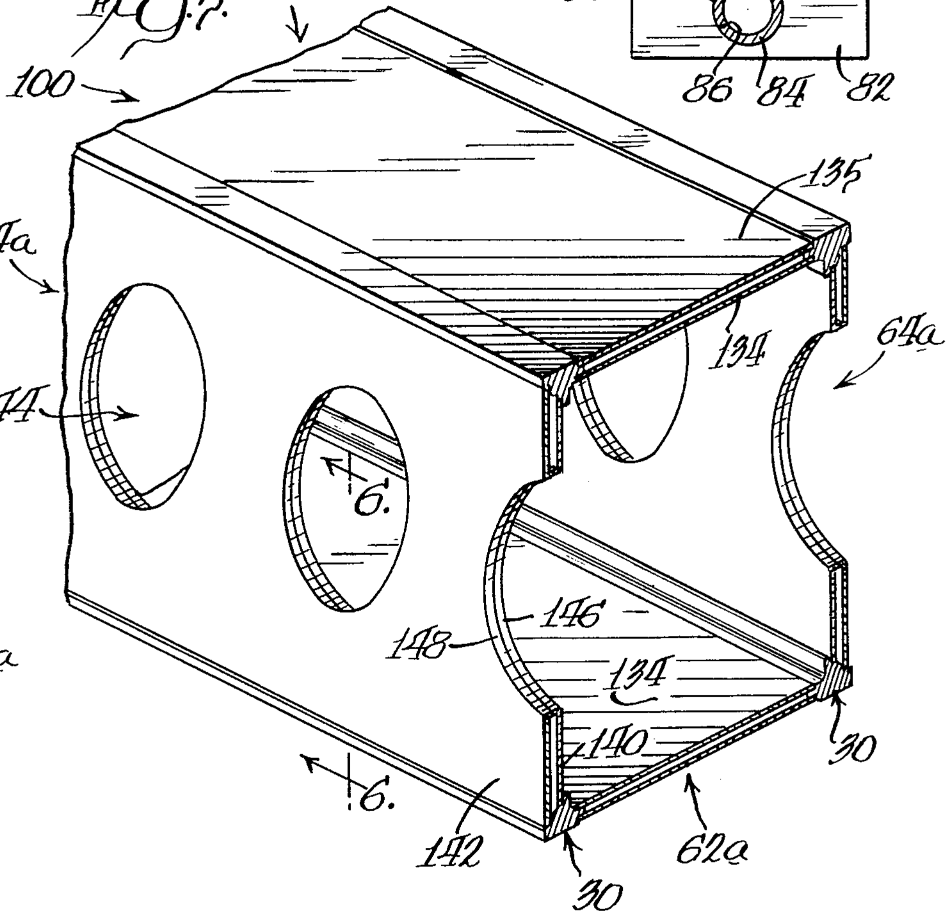
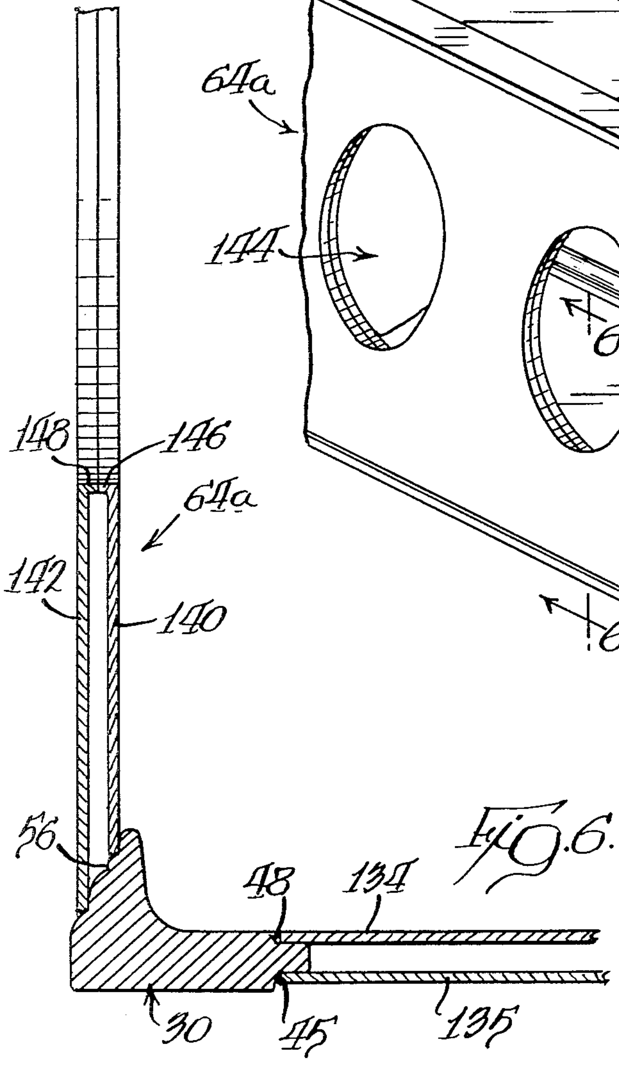
Fig. 6.

METHOD OF FORMING HOLLOW BOOM

This is a division of application Ser. No. 844,213, filed Oct. 21, 1977, now U.S. Pat. No. 4,171,598.

BACKGROUND OF THE INVENTION

The present invention relates generally to booms and more specifically to multi-section booms which are telescoped with respect to each other to vary the effective length of the boom.

The use of booms for handling various types of materials has been common practice for many years. Usually these booms are supported on some type of support structure or turntable which in turn is supported on a mobile frame so that the boom can be raised and lowered with respect to the turntable and the turntable can be rotated 360 degrees with respect to the support structure to increase the versatility thereof.

To further increase the versatility of the unit, the booms are formed in multiple sections which are telescoped within each other and can be extended and retracted to vary the effective length thereof. For example, presently there are several types of cranes that have a boom formed with three or more sections which are extended and retracted with respect to each other through suitable power means, such as fluid rams.

In the formation of booms of this type, it has been customary to form the respective boom sections from metal plates that are welded to each other and reinforced at appropriate locations to provide sufficient strength to support a load on the outer end thereof. It will be appreciated that this presents many problems in that a boom may have an overall length, with a job assembly attached thereto, to extend more than 100 feet from the turntable or support.

SUMMARY OF THE INVENTION

According to the present invention, a hollow boom is formed from a specifically designed corner section and a plurality of flat plates which can be interconnected to each other to produce a hollow boom that has greater strength to weight ratio than present existing booms.

More specifically, the boom is formed with corner sections that are all identical in cross section and include first and second legs extending from a corner portion and the corner portion has flat surface portions that intersect at an angle. Each leg of each corner section has one or more recesses and all of the recesses are located within planes that extend from the flat surface portions and the respective recesses receive plates that define the walls of the hollow boom. With the structure described above, the boom has the greatest mass at the corners thereof which are the areas where the highest stresses are developed when a load is supported by the boom.

In forming a rectangular hollow boom, four corner sections of identical cross sections and four flat plates are utilized to define the walls of the boom. Each corner section is generally L-shaped in cross section with first and second legs extending perpendicular to each other and having inner and outer surfaces with each leg having a first recess on an inner surface at the free end thereof and each of the second legs having a second recess on the outer surface of the free end thereof.

A pair of such sections are positioned in spaced parallel relation to each other and a first metal plate is positioned so that opposite edges thereof are located in the first recesses and are permanently secured thereto to define a first wall for the boom. A second wall for the boom is formed in the same manner and the two walls are then positioned in spaced parallel relation to each other and third and fourth metal plates are respectively located in the second recesses of the respective corner sections and secured thereto to define a rectangular boom that is hollow in cross section.

According to another aspect of the invention, at least a pair of walls, which define the vertical walls for the boom, are reinforced by either welding stiffening ribs thereto or by utilizing additional plates that are spaced from the first plates of the wall and connected to the corner sections as well as reinforcing flanges extending between the plates and surrounding openings to define further reinforcement for the respective walls.

The hollow boom section also incorporates a unique support at one end thereof which is pivoted thereon and provides additional support for a second boom section that is telescopically received within the first boom section.

It has been found that utilizing a corner section of the particular configuration described above substantially reduces the inventory required for making boom section of different sizes and different weights. The corner section can be utilized for making all of the telescoping boom sections for a crane boom and it is only necessary to stock different sizes of flat plates for making the respective boom sections of different cross-sectional size. As can be appreciated, this substantially reduces the space required for maintaining an inventory of parts for making boom sections of various sizes.

BRIEF DESCRIPTION OF SEVERAL VIEWS OF THE DRAWINGS

FIG. 4 is a longitudinal section of one end of one boom section showing an additional support mechanism for a second boom section telescoped therein;

FIG. 5 is a fragmentary perspective view of a slightly modified form of boom construction;

FIG. 6 is a fragmentary sectional view of one corner of the boom shown in FIG. 5.

DETAILED DESCRIPTION OF THE PREFERRED EMBODIMENTS

Figures 1, 2, 3, 3A:
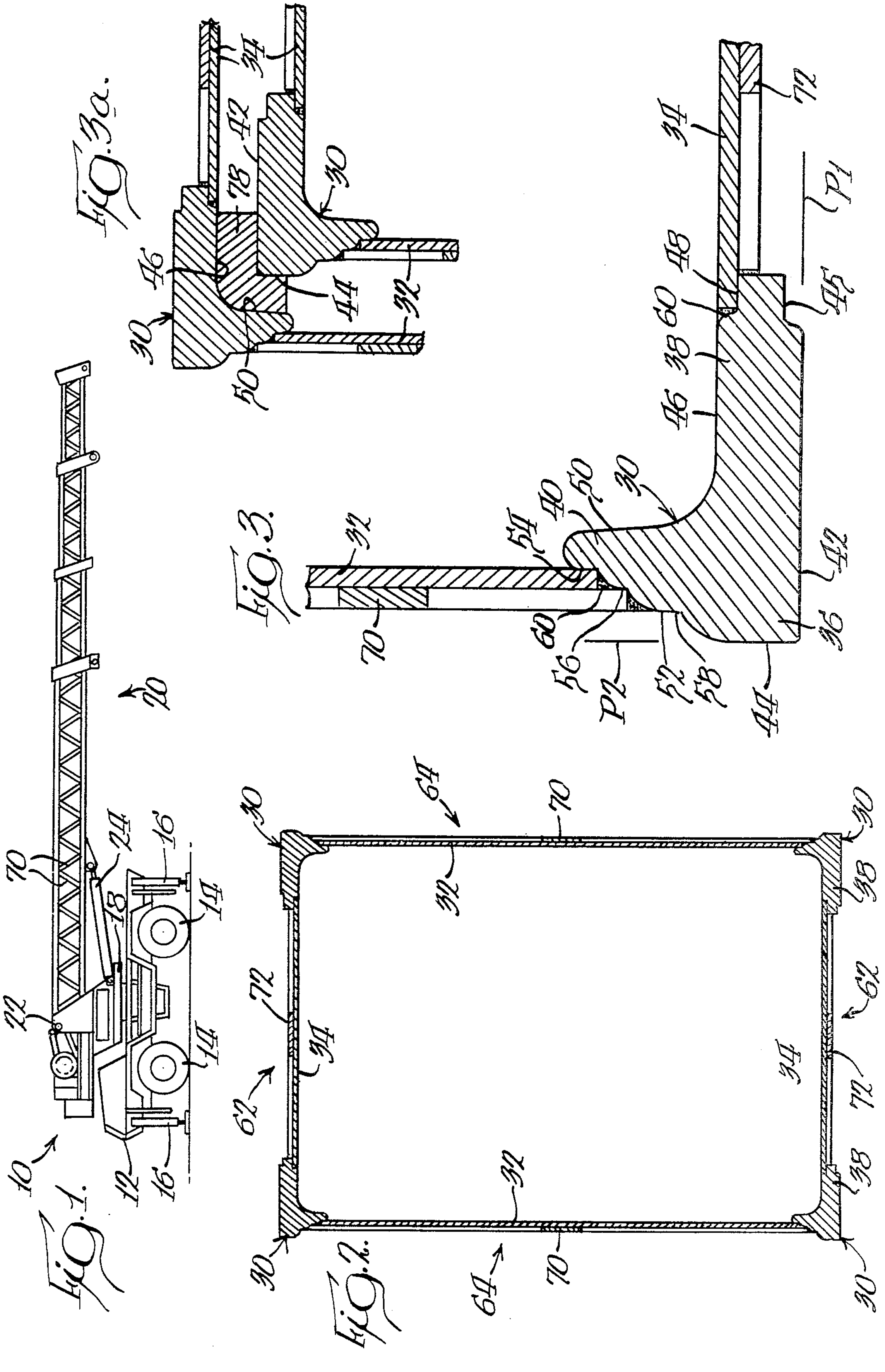
FIG. 1 schematically illustrates a crane having a boom constructed in accordance with the teachings of the present invention incorporated therein.
FIG. 2 is a cross-sectional view of one of the boom sections illustrated in FIG. 1.
FIG. 3 is an enlarged fragmentary sectional view of one corner of the hollow boom shown in FIG. 2.
FIG. 3*a* is a fragmentary cross-sectional view showing two telescopic boom sections.

While this invention is susceptible of embodiment in many different forms, there is shown in the drawings and will herein be described in detail a preferred embodiment of the invention and modifications thereof, with the understanding that the present disclosure is to be considered as an exemplification of the principles of the invention and is not intended to limit the invention to the embodiments illustrated.

FIG. 1 of the drawings illustrates a crane, generally designated by reference numeral 10. Crane 10 consists of a base or support 12 that is supported on wheels 14 and outriggers 16 and is preferably self-propelled through a propulsion unit (not shown). A turntable 18 is rotatably supported on base 12 and a boom 20 is pivotally supported on turntable 18 by a horizontal support pin 22 and is raised and lowered through a fluid ram 24. Boom 20 consists of a plurality of boom sections, four being illustrated in FIG. 1, and each of the boom sections is constructed in accordance with the teachings of the present invention. As illustrated in FIGS. 2 and 3, each boom section consists of four corner sections 30, all of which are identical in cross-sectional configuration and are interconnected by a vertical pair of plates 32 and a horizontal pair of plates 34, as will be described later.

According to the present invention, each corner section 30 (FIG. 3) includes an elongated member that has a corner portion 36 with first and second legs 38 and 40 extending from corner portion 36 and being angularly related to each other. Corner portion 36 also has outer flat surfaces 42 and 44 that define two planes P1 and P2 that intersect at an angle which is equal to the angle between the legs 38 and 40. Flat surface portion 42 extends to the outer end of leg 38 and defines the outer surface for first leg 38 which has a recess 45 at the outer end while the leg also has an inner flat surface 46 with a recess 48 in the outer free end of surface 46.

Likewise leg 40 has an inner generally flat surface 50 and an outer surface 52 which has at least one recess 54 at the free end thereof. Outer surface 52 also has a second generally flat recess 56 and a third flat recess 58.

Before describing the attendant advantages of the unique corner section 30, the method of assemblying the hollow boom section will now be described. A first pair of corner sections 30 are positioned in spaced parallel relation to each other so that first legs 38 extend towards each other. In the actual assembly of the boom section according to the present invention, it is preferable that the spacing be accurately controlled by utilizing an adjustable jig that accurately positions the outer flat surfaces 44 of corner sections 30 in true parallel relation to each other and at a predetermined spacing. A plate 34 is then inserted into recesses 48 of the first pair of corner members 30 and is fixedly secured thereto by a connection such as a weld 60. The welding is preferably done with a twin automatic welding machine so that both edges are simultaneously welded to the pair of corner sections 30 which reduces the time and cost involved for producing a first wall 62. A second identical wall 62 is formed in the same manner using a second pair of corner sections 30 and a second plate 34.

The first and second walls 62 are then positioned in spaced parallel relation to each other and a third flat metal plate 32 is positioned into recesses 54 and opposite edges thereof are again welded to the two corner sections. The three walled member is then rotated 180 degrees and a fourth plate 32 is positioned into the remaining two recesses 54 of two adjacent pairs of corner sections 30 and the opposite edges thereof are again welded or permanently secured to produce the hollow boom section which is illustrated in FIG. 2.

According to a further aspect of the invention, at least one pair of spaced parallel walls are reinforced by reinforcing means which will now be described. In the embodiment illustrated in FIGS. 2 and 3, the two spaced parallel vertical walls 64 are reinforced by elongated members or ribs 70 which are placed into contiguous engagement with plates 32 and have opposite ends thereof respectively received into the intermediate recesses 56 so that the ribs may be welded directly to the outer surface of plates 32. The configuration or position of the particular ribs may take a variety of forms and one general pattern has been illustrated in FIG. 1. Of course, the number and position of the ribs 70 may vary according to the size of the boom section being constructed. If desired, the horizontal first and second wall 62 may likewise be reinforced in the same manner utilizing similar ribs 72.

As can be appreciated from the above description, the unique method of assemblying a hollow rectangular boom considerably reduces the amount of time required for producing a complete boom and also substantially reduces the amount of time required for welding the various pieces together. However, the primary advantage of a boom construction of the type discussed above is that it substantially reduces the storage space required for maintaining an adequate inventory of the pieces necessary for forming booms of various different sizes. Since all four corner sections are identical in construction and can be used for making different cross-sectional sizes of boom sections, the amount of space required for storing the small corner sections is minimal. Furthermore, the only additional elements that are needed for forming the finished boom are flat plates, such as plates 32 and 34, which again can be stored in a small space. By maintaining an inventory of different sizes of plates, any number of boom configurations can be assembled from a small inventory of parts requiring minimum storage space.

A further advantage of the particular cross-sectional configuration of each corner section 30 is that the planes P1 and P2 which are defined by the flat corner surfaces 42 and 44 are located outside of the various interconnecting elements so that these corner section surfaces may be utilized as guide surfaces for guiding the various boom sections with respect to each other. For example, as illustrated in FIG. 3*a*, the flat outer surface 42 of one boom section can be positioned to be parallel with an inner surface 46 of another boom section while the outer surface 44 can be located parallel to surface 50 and suitable guide elements, such as plastic bearing members 78 can be provided between the adjacent surfaces of the respective corners.

According to another aspect of the invention, a unique end support member is provided for at least some of the boom sections that form boom 20. As illustrated in FIG. 4, one end of the hollow rectangular boom section has a pair of inclined members 80 welded to the outer surface of vertical plates 32 with the lower ends 82 of the respective plates or members located beyond the free end of plates 32 and below the corner sections on opposite edges of horizontal plate 34. A pipe or pivotable support member 84 extends between the two lower end portions 82 and is rotatably supported or pivotally supported in openings 86 defined in the respective members. Pipe 84 supports a generally inverted U-shaped bracket 88 having first and second downwardly directed members 90 at opposite ends thereof which is directly attached to the pipe 84. Thus, U-shaped bracket 88 and pipe 84 define pivotal support means for supporting one telescopic boom section which is telescoped within another boom section. The advantage of this arrangement is that generally inverted U-shaped bracket 88 can pivot within openings 86 to accommodate some bending of a boom section supported thereon. If desired, suitable bearing members 92 can be supported on the upper surface of U-shaped bracket 88.

A slightly modified form of the invention is shown in FIGS. 5 and 6 and the modified form relates primarily to the type of reinforcing means utilized for the respective walls of the hollow boom section. Corner sections 30 can be identical to the corner section described above. In the embodiments illustrated in FIGS. 5 and 6, hollow boom section 100 again includes four corner sections 30 that are interconnected by a plurality of plates as will now be described. In this embodiment of the invention, the horizontal walls 62*a* include an inner plate 134 that has opposite edges received into inner recesses 48 and an outer plate 135 received into outer recesses 45 so that the horizontal walls 62*a* are reinforced by the second plate 135. Again plate 135 can have its opposite edges welded to the respective corner sections 30 to provide the permanent securement.

In the embodiment illustrated in FIGS. 5 and 6, vertical wall 64*a* includes an inner plate 140 and an outer plate 142. Plates 140 and 142 have aligned openings 144 defined therein and the periphery of the openings are defined by flanges 146 and 148 that are respectively integral with the plates 140 and 142. The inner edges of the respective flanges 146 and 148 extend towards each other and have free ends in contiguous engagement with each other. These free ends are preferably welded to each other to further reinforce vertical walls 64*a*.

While flanges 146 and 148 have been described above as being integral with the respective plates 140 and 142, a single plate-like element could be substituted for the two flanges and have its opposite edges respectively welded to the respective plates. Of course, the configuration and size of the openings are a matter of choice and any size or configuration could be utilized.

It will also be appreciated that all four walls could have the reinforcing of the type illustrated with respect to vertical wall 64*a* or alternatively all four walls could be defined by spaced parallel plates such as plates 134 and 135.

Thus, it will be seen that a single corner section can be utilized for providing any number of sizes of boom sections by utilizing different sized plates and a single cross-sectional configuration for corner piece or section 30 can also be utilized with different types of reinforcing means. Of course, if the reinforcing is in the form illustrated in FIGS. 2 and 3, outer recesses 45 and 58 on the respective legs could be eliminated and, in fact, if desired recesses 56 could also be eliminated and the respective reinforcing ribs 70 could terminate adjacent the edge of plate 32.

Summarizing, the present invention substantially reduces the cost of setting up and welding various components to produce a hollow boom section and the number of parts that must be maintained in inventory is maintained at a minimum. Furthermore, the largest portion of the cross-sectional mass for boom 20 is located at the respective corners of the booms which results in greater section stability. In addition, the particular configuration of the boom sections described provides for greater section stiffness of the walls of the boom and better control of edge buckling, particularly the vertical wall when concentrated reaction forces are applied thereto. By having the corner sections identical in instruction and in configuration, the plates required for producing the embodiment illustrated in FIGS. 2 and 3 could be sheared from a flat plate stock. The particular boom construction allows for extremely fine tolerance control between the spacing of the various surfaces that define the respective corners of the boom. The present invention would also eliminate the need for tack-welding, which is presently necessary to initially attach the various components of a boom section to each other before final welding takes place. The strength of the respective booms could readily be varied by utilizing plates of different thicknesses with the same type of corner section and with additional or heavier stiffeners such as the rib 70 and 72 illustrated in FIG. 3.

While the particular configuration of a boom has been illustrated as being rectangular, it will readily be appreciated that different shapes could be utilized, such as triangular shapes, which would require only three corner sections having recesses located in a similar manner to receive the flat plates or the partially formed plates respectively illustrated in the two embodiments of the invention described above.

I claim:

1. A method of producing a hollow, rectangular boom comprising the steps of:

(1) forming four metal corner sections, each of said corner section being generally L-shaped in cross-section with first and second legs extending substantially perpendicular to each other and having inner and outer surfaces, one of said legs having a first recess on said inner surface on the free end thereof and the other of said legs having a second recess on said outer surface on the free end thereof, the outer surface of each corner section having flat portions extending perpendicularly to each other at an outer peripheral corner of each corner section, (2) positioning a first pair of said corner sections in spaced parallel relation to each other, (3) positioning a first flat metal plate so that opposite edges thereof are located in said first recesses, (4) permanently securing opposite edges of said first flat metal plate to the respective corner sections to produce a first wall for said boom, (5) repeating steps 2, 3 and 4 with a second pair of corner sections, a second flat metal plate substantially identical in size to said first metal plate to produce a second wall for said boom, (*6*) positioning said first and second walls in spaced parallel relation to each other, (7) positioning a third flat metal plate so that opposite edges are located in said second recesses of an adjacent pair of corner sections, (8) permanently securing opposite edges of said third plate to said adjacent pair of corner sections, (9) positioning a fourth flat metal plate so that opposite edges are located in the second recesses of the remaining pair of corner sections, and,

(10) permanently securing the opposite edges of said fourth plate to said remaining pair of corner sections to produce a rigid hollow rectangular boom.

2. A method as defined in claim 1, in which the opposite edges of all of the plates are welded to the respective corner sections.

3. A method as defined in claim 2, including the further step of reinforcing at least a pair of opposed plates which define vertical walls for said boom.

4. A method as defined in claim 3, in which said vertical walls are reinforced by welding stiffening ribs to said opposed walls.

5. A method as defined in claim 3, in which each second leg has a third recess spaced from said second recess and in which said vertical walls are reinforced by positioning a further pair of plates in the respective third recesses to extend substantially parallel to said pair of opposed plates and welding said further pair of plates to the respective corner sections to reinforce the vertical walls.

6. A method as defined in claim 5, including the further step of producing openings surrounded by perpendicular flanges in said pair of opposed plates and said further pair of plates, aligning the plates so that the flanges of adjacent plates have free edges in abutting relation and welding the free abutting edges to each other to further reinforce the vertical walls of the boom.

7. A method of producing a hollow, rectangular boom comprising the steps of:

(1) forming four metal corner sections, each of said corner sections being generally L-shaped in cross-section with first and second legs extending substantially perpendicular to each other and having inner and outer surfaces, one of said legs having a first recess on said inner surface on the free end thereof and the other of said legs having a second recess on said outer surface on the free end thereof, the outer surface of each corner section having flat portions extending perpendicularly to each other at an outer peripheral corner of each corner section, each corner section having a third recess on said outer surface of said second leg intermediate an adjacent flat portion of said second leg and said second recess, said third recess being spaced inwardly of said adjacent flat portion and spaced outwardly of said second recess;

(2) positioning a first pair of said corner sections in spaced parallel relationship to each other;

(3) positioning a first flat metal plate so that opposite edges thereof are located in said first recesses;

(4) permanently securing opposite edges of said first flat metal plate to the respective corner sections to produce a first wall for said boom;

(5) repeating steps 2, 3 and 4 with a second pair of corner sections, a second flat metal plate substantially identical in size to said first metal plate to produce a second wall for said boom;

(6) positioning said first and second walls in spaced parallel relation to each other;

(7) positioning a third flat metal plate so that opposite edges are located in said second recesses of an adjacent pair of corner sections;

(8) permanently securing opposite edges of said third plate to said adjacent pair of corner sections;

(9) positioning a fourth flat metal plate so that opposite edges are located in the second recesses of the remaining pair of corner sections;

(10) permanently securing the opposite edges of said fourth plate to said remaining pair of corner sections to produce a rigid hollow rectangular boom;

(11) positioning a further pair of plates in the respective third recesses to extend substantially parallel to said pair of opposite plates;

(12) permanently securing said further pair of plates to the respective corner sections to reinforce the vertical walls;

(13) producing flanged openings in said pair of opposed plates and said further pair of plates;

(14) aligning the plates so that the flanges of adjacent plates have free edges in abutting relation; and

(15) permanently securing the free abutting edges to each other to further reinforce the vertical walls of the boom.

* * * * *